(12) United States Patent
Cho et al.

(10) Patent No.: US 8,650,234 B2
(45) Date of Patent: Feb. 11, 2014

(54) METHOD AND SYSTEM FOR GENERATING A RANDOM NUMBER IN DISK DRIVE

(75) Inventors: Sung-Youn Cho, Seoul (KR);
Seung-Youl Jeong, Gyeonggi-Do (KR);
Jong-Lak Park, Suwon-Si (KR);
Hak-Yeol Sohn, Seoul (KR)

(73) Assignee: Seagate Technology LLC, Cupertino, CA (US)

( * ) Notice: Subject to any disclaimer, the term of this patent is extended or adjusted under 35 U.S.C. 154(b) by 2969 days.

(21) Appl. No.: 10/872,838

(22) Filed: Jun. 21, 2004

(65) Prior Publication Data

US 2004/0258398 A1    Dec. 23, 2004

(30) Foreign Application Priority Data

Jun. 21, 2003 (KR) .................. 10-2003-0040481

(51) Int. Cl.
*G06F 7/58* (2006.01)
(52) U.S. Cl.
USPC ........ 708/254; 386/248; 386/328; 369/47.15; 710/33; 708/250; 708/255; 711/112
(58) Field of Classification Search
USPC ................ 386/91, 45, 94, 248, 328; 711/112; 369/47.15; 710/33; 708/250, 254–255
See application file for complete search history.

(56) References Cited

U.S. PATENT DOCUMENTS

| | | | | |
|---|---|---|---|---|
| 2,872,665 | A * | 2/1959 | Townsend et al. | 710/33 |
| 4,694,412 | A * | 9/1987 | Domenik et al. | 708/251 |
| 6,490,058 | B1 * | 12/2002 | Takabatake et al. | 358/442 |
| 6,526,010 | B1 * | 2/2003 | Morioka et al. | 369/47.15 |
| 6,792,438 | B1 * | 9/2004 | Wells et al. | 708/250 |
| 6,886,023 | B2 * | 4/2005 | Lundberg | 708/251 |
| 6,963,952 | B1 * | 11/2005 | La | 711/112 |
| 8,019,935 | B2 * | 9/2011 | Guyot et al. | 711/112 |
| 2004/0258398 | A1 * | 12/2004 | Cho et al. | 386/96 |

OTHER PUBLICATIONS

Korean Patent Application No. 1020000060334 to Koichi et al., having publication date of Jun. 25, 2001 (w/ English Abstract).
Japanese Patent Application No. 10-211108 to Kazuyuki., having publication date of Feb. 18, 2000 (w/ English Abstract).
Korean Patent Application No. 1019990039346 to Lim, having Application date of Sep. 14, 1999 (w/ English Abstract).

* cited by examiner

*Primary Examiner* — Helen Shibru
(74) *Attorney, Agent, or Firm* — Cesari & Reed, LLP; Kirk A. Cesari; Christian W. Best (57) ABSTRACT

For generating a random number in a disk drive, a seed is generated from a respective sector number for each of at least one sector of the disk drive. The random number is calculated using the seed. The seed that is generated with enhanced unpredictability and complexity is used to generate the random number for secure data cryptography within the disk drive.

19 Claims, 6 Drawing Sheets

METHOD AND SYSTEM FOR GENERATING A RANDOM NUMBER IN DISK DRIVE

BACKGROUND OF THE INVENTION

This application claims priority to Korean Patent Application No. 2003-40481, filed on Jun. 21, 2003, in the Korean Intellectual Property Office, the disclosure of which is incorporated herein in its entirety by reference.

1. Field of the Invention

The present invention relates to a method and system for generating a random number, and more particularly, to generating the random number using sector numbers within a disk drive.

2. Description of the Related Art

Random numbers are used in many applications, and especially in cryptography which is broadly defined as "the art and science of keeping data secure." Three major elements of data security include authentication, confidentiality, and integrity.

Authentication ensures that only an authorized user has access to data. An example protocol for authentication using a random number is as follows:

A. a user requests access to data that is password protected on a server;

B. the server responds with a random challenge which is a random number combined with other information;

C. the user encrypts the random challenge using its password as a key and returns the encrypted challenge to the server;

D. the server encrypts the same random challenge with the user's password retrieved from its own database; and E. the server compares the two encrypted random challenges, and if they are the same, the user is authorized to have access to the data.

In this manner, because the random challenge is used, the user is authorized without the user ever sending just the password over a network. In addition, because a random number is used, the random challenge constantly changes over time for secure authorization.

Confidentiality ensures that an unauthorized person is not able to extract meaningful data from encrypted data. Data encryption is the process of combining plain text with a cryptographic key to generate encrypted data which ideally is impossible to decrypt without a decryption key. Random numbers, used for such encryption and description keys, are essential for data encryption.

Integrity detects for undesired tampering to data using a digital signature which is a binary string of fixed length (i.e., a cryptography hash) unique to a given message and signed with the originator's private key. A user having the originator's public key decrypts the message and is ensured that the owner of the private key originated the message. Random numbers are used to generate such digital signatures.

In this manner, random numbers are essential for the various data security protocols, and a higher degree of randomness of the random number enhances the level of security.

Figure 1:
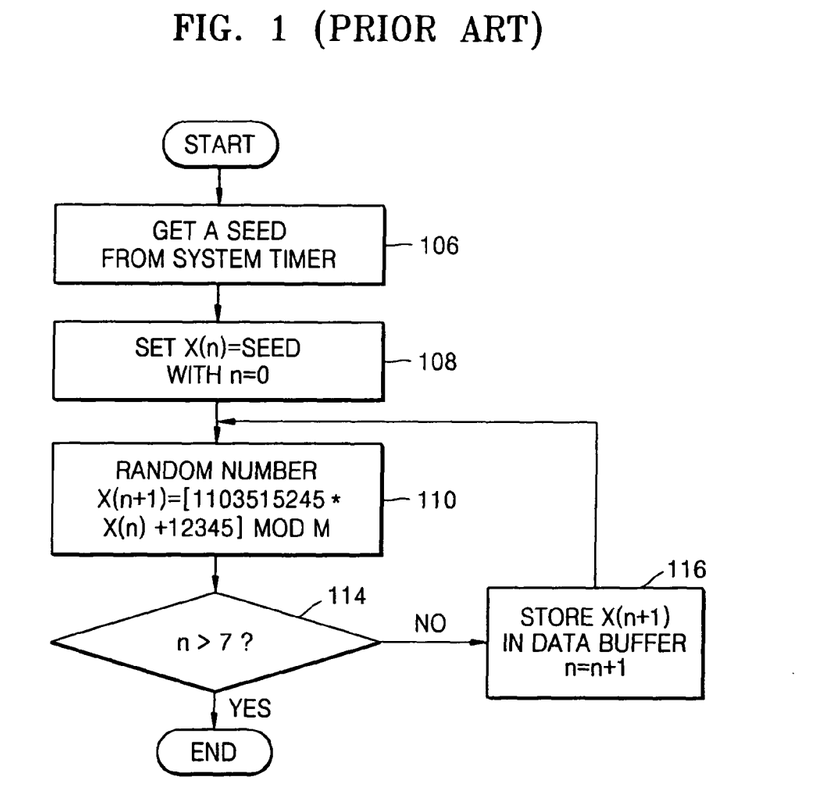
FIG. 1 is a flowchart of a prior art method of generating a random number.
Figure 2:
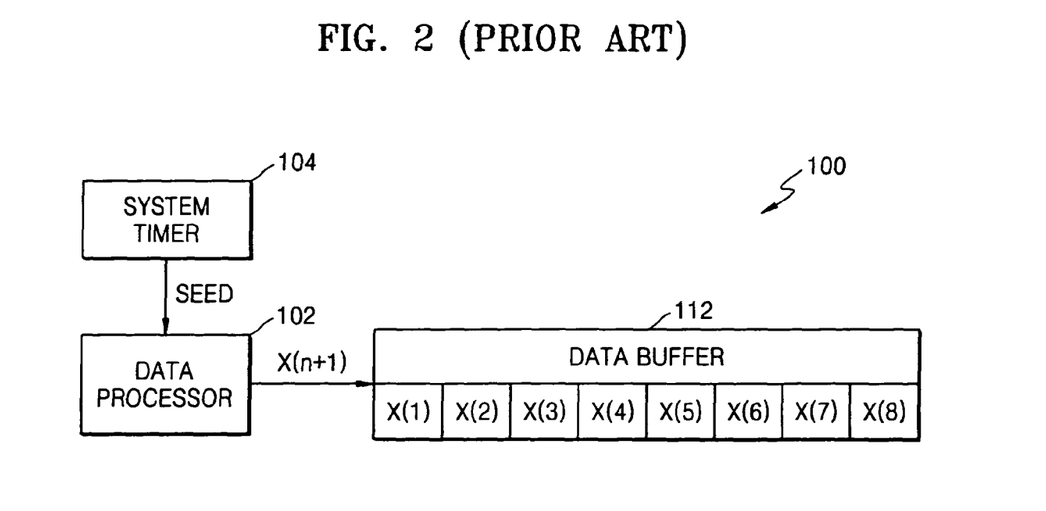
FIG. 2 is a prior art system for generating the random number according to the method of FIG. 1.

FIGS. 1 and 2 show a flowchart and a system 100 for generating a random number according to the prior art. The system 100 includes a data processor 102 that receives a variable SEED from a system timer 104 (step 106 of FIG. 1). The system timer 104 generates SEED depending on the current time at the system 100. The data processor 102 then sets a variable $X(n)=$SEED, initially with n=0 (step 108 of FIG. 1). Next, the RANDOM NUMBER $X(n+1)$ is generated as follows (step 110 of FIG. 1):

$$\text{RANDOM NUMBER}, X(n+1)=[1103515245*X(n)+12345] \bmod M$$

Such an equation is an example of a linear congruential random number generator calculated by the data processor 102 of FIG. 2. This equation for $X(n+1)$ is described in the well-known book entitled *The C Programming Language* by Brian W. Kernighan and Dennis M. Ritchie. Such an equation for $X(n+1)$ includes modular arithmetic with mod M that returns a random integer in the range [0-(M-1)], when the SEED=$X(0)$ is also in a range of [0-(M-1)]. For example, if the SEED=$X(0)$ is eight bits long, the SEED is in a range of 0 to (2811)=255, and M=256.

After the RANDOM NUMBER $X(n+1)$ is calculated at step 110 and if n is not greater than 7 (step 116 of FIG. 1), $X(n+1)$ is stored within a data buffer 112 in the system 100 (step 110 of FIG. 1). In addition in that case, n is incremented by 1 (i.e., n=n+1) (step 116 of FIG. 1), and the flowchart loops back to step 110 to calculate the next $X(n+1)$ with the incremented n. On the other hand, if n is great than 7, the flowchart of FIG. 1 ends.

Thus, steps 110, 114, and 116 are repeated until n>7 when $X(1), X(2), X(3), X(4), X(5), X(6), X(7)$, and $X(8)$ are generated and stored within the data buffer 112. The binary bits of such random numbers $X(1), X(2), X(3), X(4), X(5), X(6), X(7)$, and $X(8)$ may be sequentially appended to form a random number of increased bits. For example, when the SEED from the timer 104 is just eight bits long, each of the random numbers $X(1), X(2), X(3), X(4), X(5), X(6), X(7)$, and $X(8)$ is also eight bits long. To generate a random number that is 64-bits long, $X(1), X(2), X(3), X(4), X(5), X(6), X(7)$, and $X(8)$ are sequentially appended together.

Any random number generated from calculation by a data processor is not "purely random." In contrast, tossing a dice or movement of an electron are "purely random" physical processes. Thus, a random number generated from calculation by a data processor is deemed to be "pseudo random." Such a pseudo random number follows a same repeatable pattern when the starting SEED is the same, and there is only a finite set of possible SEED values.

Thus, the quality (i.e., the level of randomness) of a pseudo random number generator depends on the quality of the SEED value. The SEED value is desired to be as random as possible and is desired to have high complexity meaning a high number of bits that are as unpredictable as possible.

The prior art method and system of FIGS. 1 and 2 are disadvantageous because the SEED value from the timer 104 is comprised of only eight bits. In addition, because the SEED value is dependent on the current time from the timer 104, such a value may not necessarily be unpredictable.

Data security is becoming an important factor in HDD (hard disk drives) for modern consumer electronics. A hard disk drive has advantages of random access, high data transmission speed, low cost, and high capacity as compared with other auxiliary memory devices. Thus, hard disk drives are being widely used in storing multimedia data for example.

In particular, a personal video recorder (PVR) is generally used for storing digital audio/video (AV) data received from broadcasting stations on a hard disk drive and reproducing the stored digital AV data. The digital AV data is generally encrypted and scrambled, so that it cannot be used without a valid broadcast receiver. However, the digital AV data to be stored on the hard disk drive may be intercepted during transmission by an unauthorized third party. Thus, various measures have been taken to prevent such interception.

For example, Korean Patent Publication No. 2001-27550 discloses a device for storing received digital AV data on a hard disk drive through repeated descrambling and encryption. The device includes a random number generator having a different initial value with respect to each broadcast receiver for such descrambling and encryption.

In any case, because data security is becoming such an important factor for hard disk drive applications, a mechanism for generating a random number with high randomness is desired.

SUMMARY OF THE INVENTION

Accordingly, the present invention generates a seed with high randomness and complexity using sector numbers of a disk drive.

In a general method and apparatus for generating a random number in a disk drive, a seed is generated from a respective sector number for each of at least one sector of the disk drive. The random number is calculated using such a seed within the disk drive.

In one embodiment of the present invention, the seed is generated from a respective sector number for each of a plurality of sectors accessed within the disk drive at a respective time. In that case, each of the sector numbers is read from an interface register at the respective time.

In yet another embodiment, a time period between reading a previous sector number and a subsequent sector number is determined by the previous sector number.

In a further embodiment, each of the sector numbers is sequentially appended after being read from the interface register to generate the seed.

The plurality of sectors may be disposed on a same track or on different tracks within the disk drive.

The seed thus generated may be advantageously used by a linear congruential random number generator to generate the random number. Such a random number may be particularly applied for authentication or data encryption within the disk drive such as a HDD (hard disk drive) for storing A/V (audio/video) data within a PVR (personal video recorder).

In this manner, the seed is generated using sector numbers of sectors that are accessed at various time periods such that the seed is relatively unpredictable. In addition, the sector numbers may be combined to form the seed having a relatively high number of bits for enhanced complexity. The seed that is generated with such unpredictability and complexity is used to generate a random number for secure data cryptography within the disk drive.

BRIEF DESCRIPTION OF THE DRAWINGS

The above and other features and advantages of the present invention will become more apparent by describing in detail exemplary embodiments thereof with reference to the attached drawings in which.

The figures referred to herein are drawn for clarity of illustration and are not necessarily drawn to scale. Elements having the same reference number in FIGS. 1, 2, 3, 4, 5, 6, 7, 8, and 9 refer to elements having similar structure and/or function.

DETAILED DESCRIPTION OF THE INVENTION

The present invention is described herein for a HDD (hard disk drive). However, the present invention may be applied for generating a random number within any other types of disk drives having sectors that are accessed for read/write of data.

Figure 3:
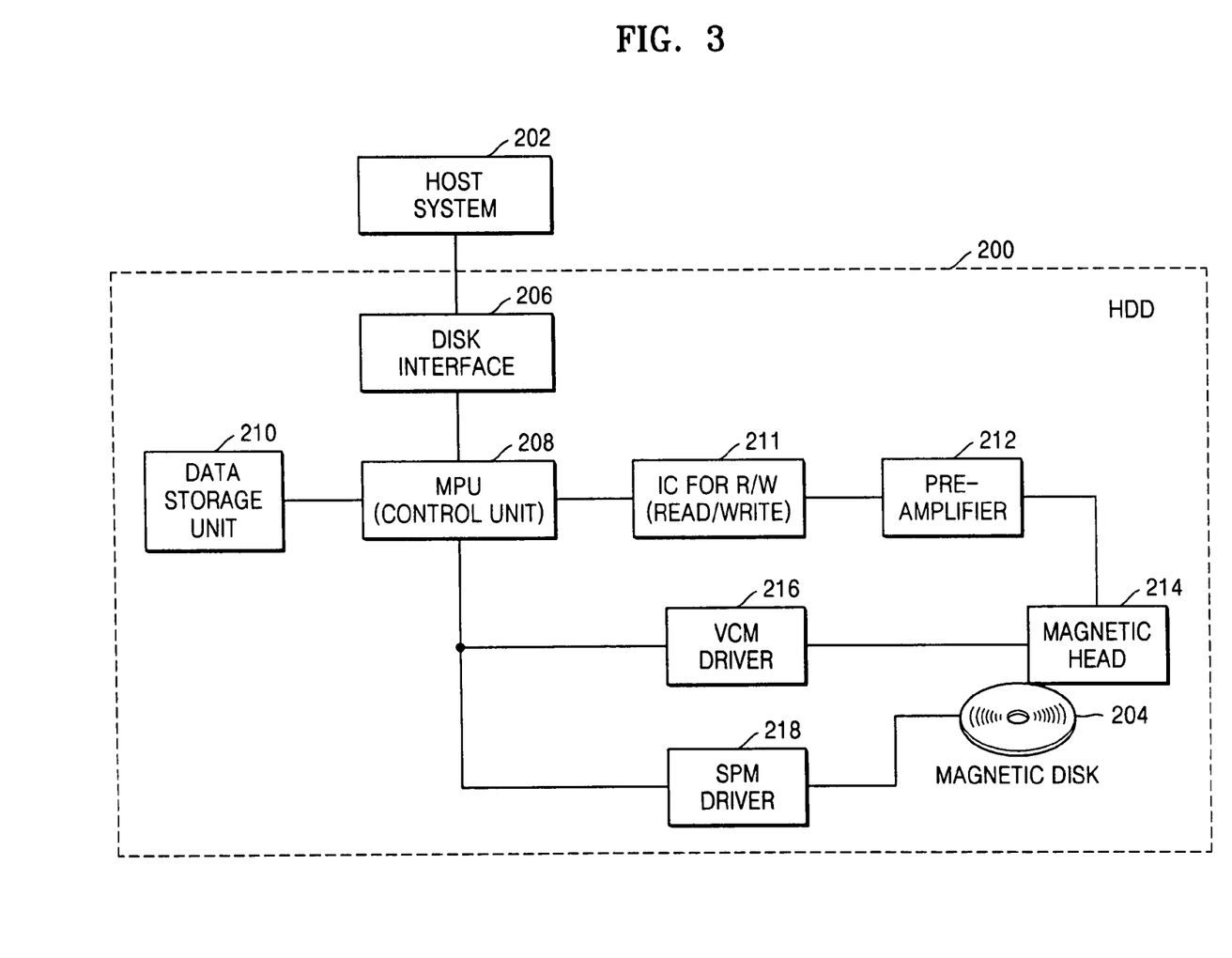
FIG. 3 is a block diagram of components within a HDD (hard disk drive) adapted to generate a random number according to an embodiment of the present invention.

FIG. 3 shows a block diagram of a disk drive 200 such as a HDD (hard disk drive) for example that stores data magnetically. A host system 202 accesses the disk drive 200 for reading/writing data from/to a magnetic disk 204 within the disk drive 200. The disk drive 200 includes a disk interface 206 to the host system 202.

A MPU (main processing unit) 208 is a data processor that controls operation of the components of the disk drive 200 and is coupled to the disk interface 206. The MPU 208 is also coupled to a data storage unit 210 that stores various instructions and data for operation of the MPU 208.

In addition, the MPU 208 is coupled to a read/write IC (integrated circuit) 211 for performing the read/write of data from/to the magnetic disk 204. A pre-amplifier 212 amplifies signals from/to a magnetic head 214 used for reading/writing data from/to the magnetic disk 204. The MPU 208 controls a VCM (voice coil motor) driver 216 that moves the magnetic head 214 with respect to the magnetic disk 204. The MPU 208 also controls a SPM (spindle motor) driver 218 that rotates the magnetic disk 204 with respect to the magnetic head 214. The components of FIG. 3 for typical operations of read/write from/to the magnetic disk 204 are known to one of ordinary skill in the art.

Figure 4:
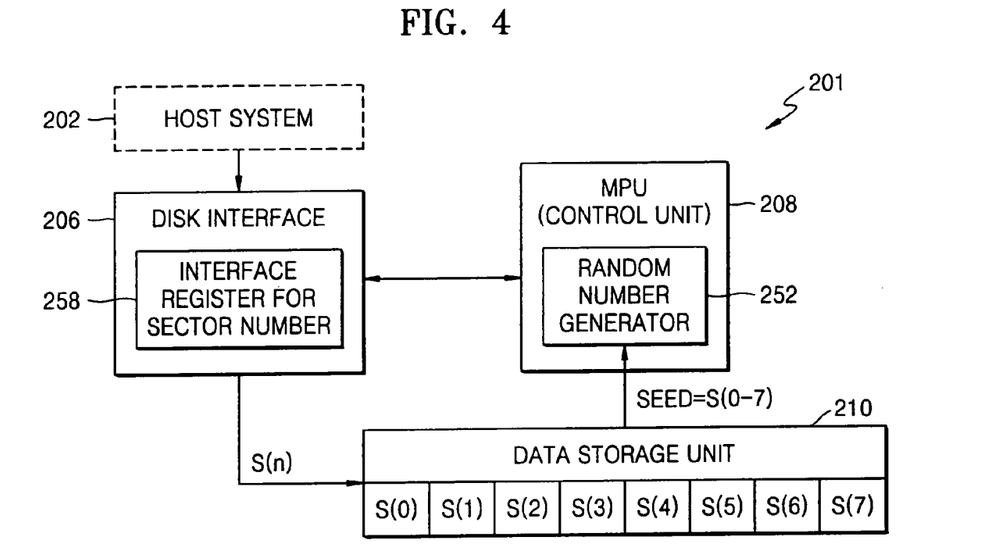
FIG. 4 is a block diagram of a system implemented with components within the HDD in FIG. 3 for generating the random number according to an embodiment of the present invention.

However, the components of the HDD 200 are further modified from the prior art to form a system 201 of FIG. 4 for generating a random number according to the present invention. Referring to FIG. 4, the MPU 208 is modified to include a random number generator 252, and the data storage unit 210 is modified to store a plurality of sector numbers to generate a seed according to the present invention.

Figure 5:
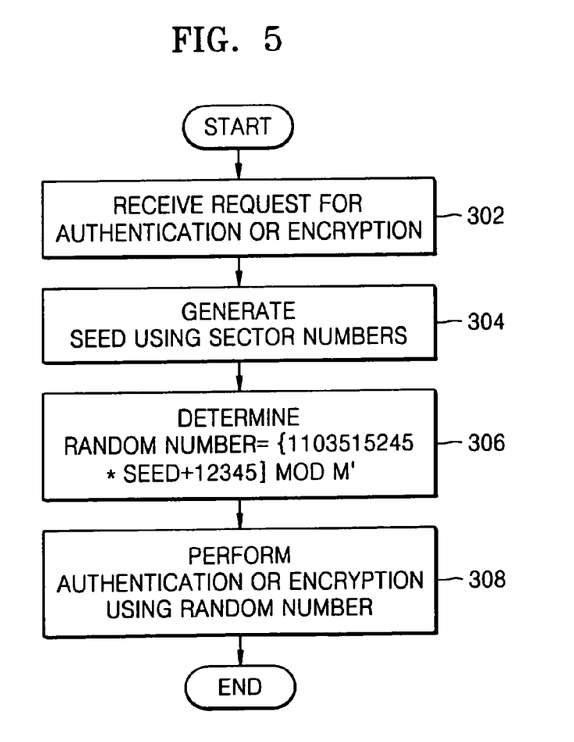
FIG. 5 shows a flowchart of steps during operation of the system of FIG. 4 for generating the random number according to an embodiment of the present invention.
Figure 6:
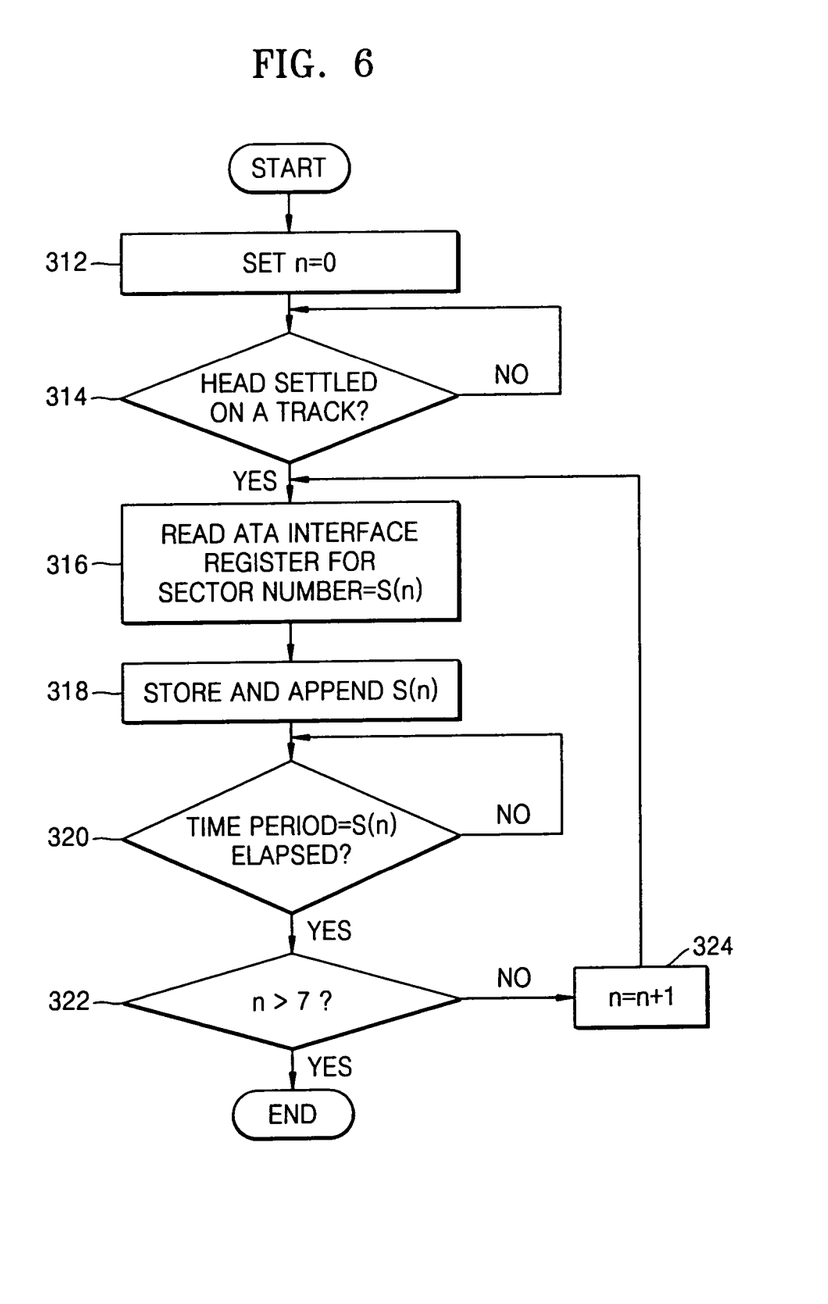
FIG. 6 shows a flowchart of steps during operation of the system of FIG. 5 for generating a seed using sector numbers according to an embodiment of the present invention.
Figure 9:
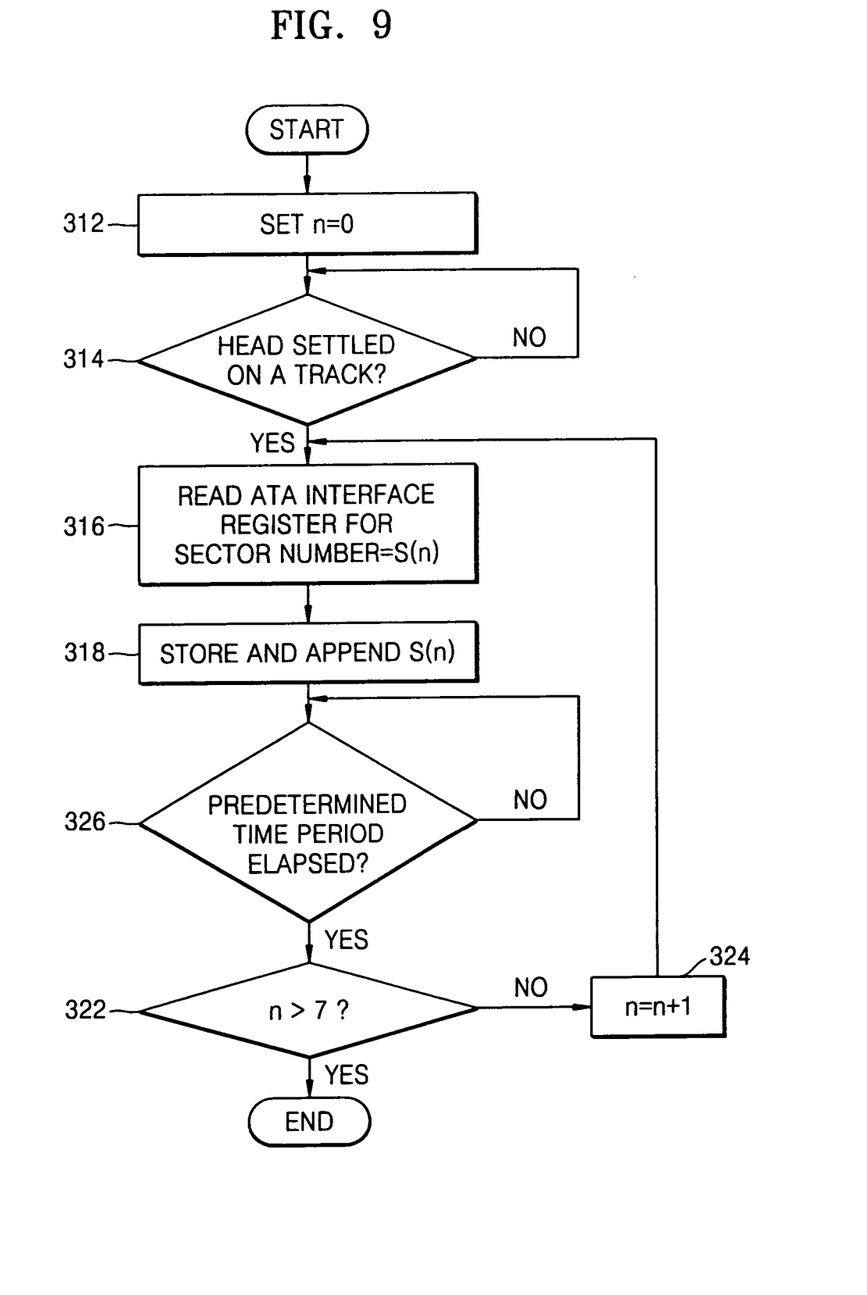
FIG. 9 shows a flowchart of steps for generating a seed using sector numbers of sectors located on different tracks, according to another embodiment of the present invention.

Furthermore, the MPU 208 is modified to perform the steps of the flowcharts of FIGS. 5, 6, and/or 9, especially when the HDD 200 is used within an application requiring data cryptography such as a PVR (personal video recorder) for processing A/V (audio/video) data. FIGS. 5, 6, and 9 show flowcharts of steps performed by the MPU 208 when executing sequences of instructions stored within the data storage unit 210.

FIG. 5 shows a flowchart of steps for generating a random number for data cryptography within the HDD 200. Referring to FIGS. 4 and 5, the MPU 208 receives a request for data cryptography such as user authentication or data encryption (step 302 of FIG. 5). Upon such a request, the MPU 208 generates a SEED using sector numbers within the HDD 200 (step 304 of FIG. 5). Using such a SEED, the MPU 208 generates the RANDOM NUMBER with the random number generator 252 that is a linear congruential random number generator according to one embodiment of the present invention (step 306 of FIG. 5). The MPU 208 then uses the RANDOM NUMBER for performing user authentication or data decryption (step 308 of FIG. 5).

FIG. 6 shows a flowchart with detailed sub-steps for generating the SEED in step 304 of FIG. 5. Referring to FIGS. 3, 4, 5, and 6, for generating the SEED, the MPU 208 sets a variable n=0 (step 312 of FIG. 6). The MPU 208 then waits until the head 214 settles on a track of the magnetic disk 204 (step 314 of FIG. 6).

Figure 7:
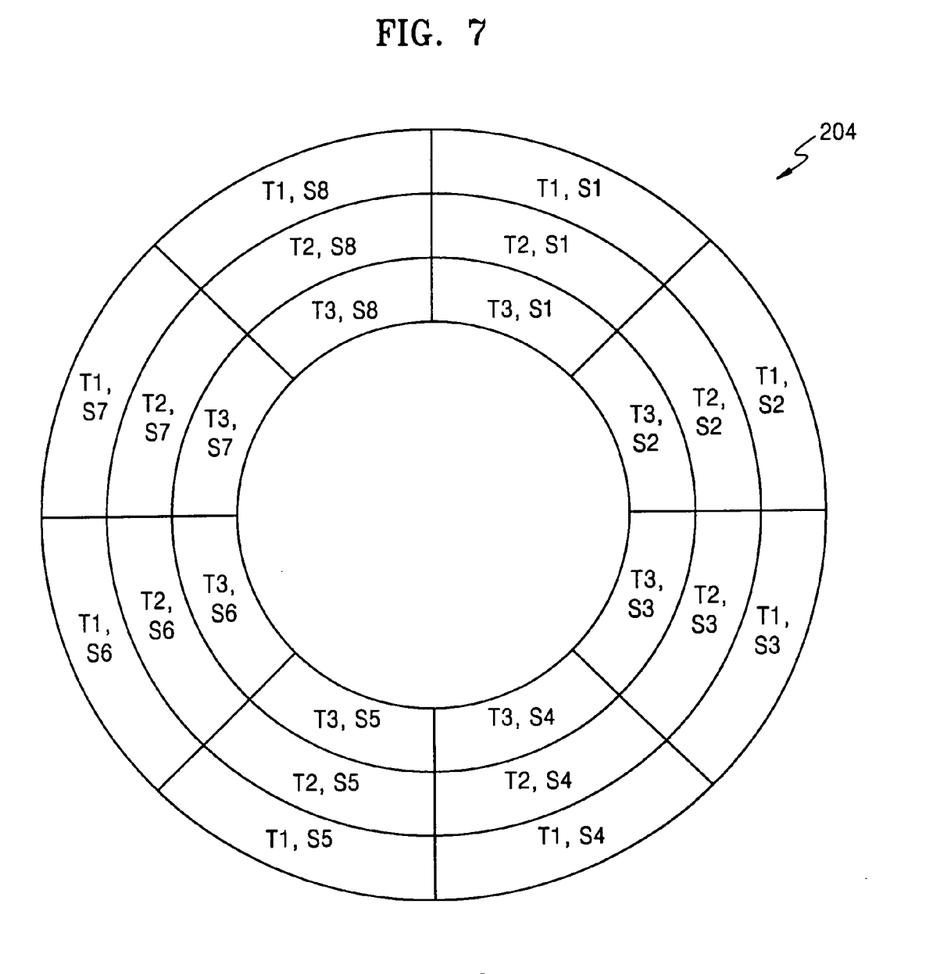
FIG. 7 shows a magnetic disk of the HDD of FIG. 3 organized into tracks and sectors.
Figure 8:
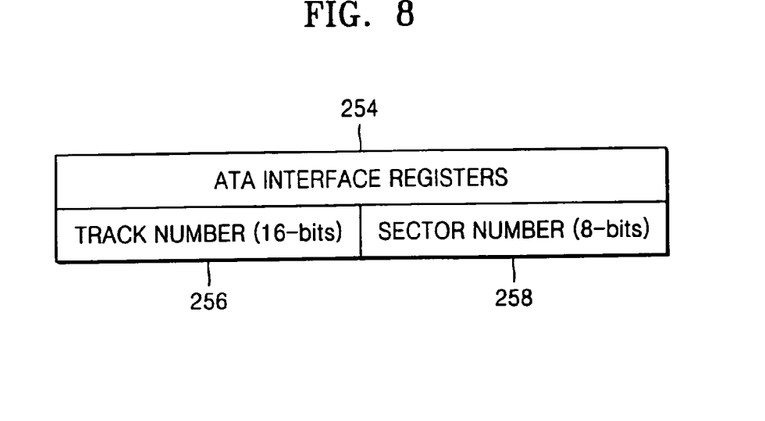
FIG. 8 shows an example ATA interface register storing the track number and the sector number for a sector to be accessed.

Referring to FIG. 7, the magnetic disk 204 is organized into a plurality of concentric tracks. Each track is then divided into a plurality of sectors. Thus, each sector on the disk 204 is labelled with TX,SY, with X referring to a track number and Y referring to a sector number. FIG. 7 shows three tracks with eight sectors per track for clarity of illustration and description. However, a typical disk of a modern HDD has tens of thousands of tracks and about $2^8=256$ sectors per track.

For reading/writing data from/to the disk 204, the host system 202 specifies the track number and the sector number to be accessed for such a read/write operation via the disk interface 206. Such information is transferred to the disk interface 206 according to the ATA/IDE standard as known to one of ordinary skill in the art.

Thus, referring to FIGS. 4 and 5, the disk interface 206 includes ATA interface registers 254 for storing such track and sector numbers. A first ATA interface register 256 stores the track number of the sector to be accessed, and a second ATA interface register 258 stores the sector number of the sector to be accessed. In the ATA/IDE standard, the first ATA interface register 256 is a 16-bit register for storing the selected track number, and the second ATA interface register 258 is an 8-bit register for storing the selected sector number.

Referring back to step 314 of FIG. 6, the magnetic head 214 settles to the track having the track number specified in the first ATA interface register 256. Thereafter, the 8-bit sector number S(n) stored in the second ATA interface register 258 is read and stored within the data storage unit 210 (steps 316 and 318 of FIG. 6). Thereafter, the MPU 208 waits a time period (step 320 of FIG. 6). In one embodiment of the present invention, such a time period depends on the value of the previous sector number S(n) read in step 316.

When such a time period has elapsed and if the value n is not greater than 7 (step 322 of FIG. 6), n is incremented by one, n=n+1 (step 324 of FIG. 6), and the flowchart loops back to step 316. With such looping back, steps 316, 318, 320, 322, and 324 are repeated with the incremented n to read a subsequent sector number stored within the second ATA interface register 258.

In this manner, each of eight sector numbers S(0), S(1), S(2), S(3), S(4), S(5), S(6), and S(7) are read at a respective time point. Each of the sector numbers S(0), S(1), S(2), S(3), S(4), S(5), S(6), and S(7) are sequentially read in that order. Because the time points for reading such eight sector numbers is different, such sector numbers are likely to be different.

In the example embodiment of the present invention, each of the sector numbers is 8-bits long. In an example embodiment of the present invention, the SEED is generated by appending the sector numbers S(0), S(1), S(2), S(3), S(4), S(5), S(6), and S(7) together in that order such that the SEED is 64 bits long. Thus, the maximum value for the variable n in step 322 is dictated by the bit-length of the sector number and the desired bit-length of the SEED.

When n is greater than 7 in step 322, the SEED is generated by appending the sector numbers S(0), S(1), S(2), S(3), S(4), S(5), S(6), and S(7) in that order. Referring to FIGS. 6 and 7, such a 64-bit SEED is used to determine the RANDOM NUMBER in step 306 of FIG. 7 with $M'=2^{64}$ for the mod function.

In one embodiment of the present invention, the sector numbers S(0), S(1), S(2), S(3), S(4), S(5), S(6), and S(7) are for sectors on a same track of the disk 204. In an alternative embodiment of the present invention, the sector numbers S(0), S(1), S(2), S(3), S(4), S(5), S(6), and S(7) are for sectors on different tracks of the disk 204. In that case, the flowchart of FIG. 9 is followed such that the MPU determines whether the head has settled on a track before each sector number is read. Thus, the flowcharts of FIGS. 6 and 9 are similar except that the flowchart of FIG. 9 loops back to step 314 after n is incremented in step 324.

Furthermore, in another embodiment of the present invention, the flowchart of FIG. 9 has a different step 326 from the step 320 of FIG. 6. In step 326 of FIG. 9, the MPU 208 determines whether a same predetermined time period has elapsed between readings of the sector numbers. Such a predetermined time period may be selected to ensure that the sector number within the second ATA interface register 258 changes within such a predetermined time period.

In contrast, in step 320 of FIG. 6, the time period elapsed between readings of the sector numbers varies depending on the value of the previously read sector number. Such variation advantageously adds further unpredictability to the read sector numbers and thus to the SEED generated with such sector numbers.

In this manner, the seed is generated using sector numbers of sectors that are accessed at various time points such that the seed is relatively unpredictable. In addition, the sector numbers are combined to form the seed having a relatively high number of bits for enhanced complexity. The seed that is generated with such unpredictability and complexity is used to generate a random number for secure data cryptography within the disk drive.

The foregoing is by way of example only and is not intended to be limiting. For example, the present invention is described herein for a HDD (hard disk drive). However, the present invention may be applied for generating a random number within any other types of disk drives having sectors that are accessed for read/write of data. In addition, the present invention may be used when the sector numbers are used with other functions or other combinations to generate the SEED. Furthermore, any numbers and values used herein are by way of example only. Thus, it should be understood by those of ordinary skill in the art that various changes in form and details may be made without departing from the spirit and scope of the present invention as defined by the following claims.

What is claimed is:

1. A method of generating a random number in a disk drive, comprising:
   generating a seed from a respective sector number for each of a plurality of sectors of the disk drive, wherein the seed is generated from a combination of the plurality of respective sector numbers of the plurality of sectors before the random number is generated from the seed; and
   calculating the random number using the seed.

2. The method of claim 1, wherein each of the plurality of sectors is accessed within the disk drive at a respective time.

3. The method of claim 1, wherein each of the sector numbers are read from an interface register at the respective time.

4. The method of claim 3, wherein a time period between reading a previous sector number and a subsequent sector number is determined by the previous sector number.

5. The method of claim 3, wherein each of the sector numbers are sequentially appended after being read from the interface register to generate the seed.

6. The method of claim 1, wherein the plurality of sectors are disposed on a same track within the disk drive.

7. The method of claim 1, wherein the plurality of sectors are disposed on different tracks within the disk drive.

8. The method of claim 1, wherein the seed is used by a linear congruential random number generator to generate the random number.

9. The method of claim 1, further comprising:
using the random number for one of user authentication or data encryption within the disk drive.

10. The method of claim 1, wherein the disk drive is a HDD (hard disk drive) for storing A/V (audio/video) data within a PVR (personal video recorder).

11. A system for generating a random number in a disk drive, comprising:
means for generating a seed from a respective sector number for each of a plurality of sectors of the disk drive, wherein the seed is generated from a combination of the plurality of respective sector numbers of the plurality of sectors before the random number is generated from the seed; and
a random number generator that calculates the random number using the seed.

12. The system of claim 11, wherein each of the plurality of sectors is accessed within the disk drive at a respective time.

13. The system of claim 12, wherein the means for generating the seed includes:
an interface register that stores each of the sector numbers at the respective time.

14. The system of claim 13, wherein a time period between reading a previous sector number and a subsequent sector number from the interface register is determined by the previous sector number.

15. The system of claim 13, wherein each of the sector numbers are sequentially appended after being read from the interface register to generate the seed.

16. The system of claim 11, wherein the plurality of sectors are disposed on a same track within the disk drive.

17. The system of claim 11, wherein the plurality of sectors are disposed on different tracks within the disk drive.

18. The system of claim 11, wherein the random number generator is a linear congruential random number generator.

19. The system of claim 11, wherein the disk drive is a HDD (hard disk drive) for storing A/V (audio/video) data within a PVR (personal video recorder).

* * * * *